United States Patent [19]

Brooks, Jr.

[11] Patent Number: 4,571,195
[45] Date of Patent: Feb. 18, 1986

[54] RECREATIONAL APPARATUS

[76] Inventor: William A. Brooks, Jr., Box 009, RD #3, McDonald, Pa. 15057

[21] Appl. No.: 548,457

[22] Filed: Nov. 3, 1983

[51] Int. Cl.⁴ ............................................. A63C 5/04
[52] U.S. Cl. .................................. 441/74; 280/12 R; 280/12 A; 280/12 H; 280/12 B
[58] Field of Search ........................... 441/74, 68, 65; 280/12 R, 12 A, 12 H, 12 K, 12 L, 12 B

[56] References Cited

U.S. PATENT DOCUMENTS

| 255,820 | 7/1980 | Borden | 280/12 H |
|---|---|---|---|
| 3,628,206 | 12/1971 | Mecham | 280/12 R |
| 3,773,342 | 11/1973 | Petrik | 280/12 H |
| 3,929,549 | 12/1975 | Smith | 441/74 |
| 4,025,082 | 5/1977 | Lummus | 280/12 H |
| 4,054,257 | 10/1977 | Miller | 280/12 R |
| 4,305,608 | 12/1981 | Muller | 280/12 H |
| 4,331,340 | 5/1982 | Bolen | 280/12 R |
| 4,439,165 | 3/1984 | Rothstein | 441/74 |
| 4,466,373 | 8/1984 | Prade | 441/74 |

FOREIGN PATENT DOCUMENTS 2545232 4/1977 Fed. Rep. of Germany ........ 441/74

Primary Examiner—Trygve M. Blix
Assistant Examiner—C. T. Bartz
Attorney, Agent, or Firm—Carothers & Carothers

[57] ABSTRACT

A recreational apparatus including an elongated body member having gripping means for use by a rider to maintain his or her position thereon in a standing, sitting or prone position and offset guide runners which are cooperable with similarly offset foot receiving means for guiding the recreational apparatus over snow or water by virtue of the user shifting his weight.

16 Claims, 3 Drawing Figures

RECREATIONAL APPARATUS

BACKGROUND OF THE INVENTION

The prior art of recreational apparatus is replete with devices with which one may propel himself, or which may be propelled over a surface. For on-land use there have been known various designs of wheeled vehicles, for example. For water use the prior art has contemplated various forms of water skis, surf boards, rafts and the like, while for use on snow there have been various designs of steel runner type sleds, molded plastic snow dishes, ski-mobiles and the like. The present invention offers a novel recreational apparatus adapted for use on both water and snow and which may be employed by a user in a standing, sitting or prone position and either with or without motive power means to propel the board. The recreational apparatus of the present invention is a formed elongated body or board preferably of foam filled, molded plastic construction, and incorporates various novel structural features including but not limited to an arrangement of longitudinally offset and laterally spaced apart divergent steering or guide runners which correspond in their offset locations to the location of formed depressions which may receive the feet of a user who chooses to ride the board in a standing position. The elongated guide runners diverge slightly toward the front of the board to provide enhanced steering capability and stability for the apparatus.

Other aspects of the invention will become apparent upon consideration of the following description and the accompanying figures, in which.

Figure 1:
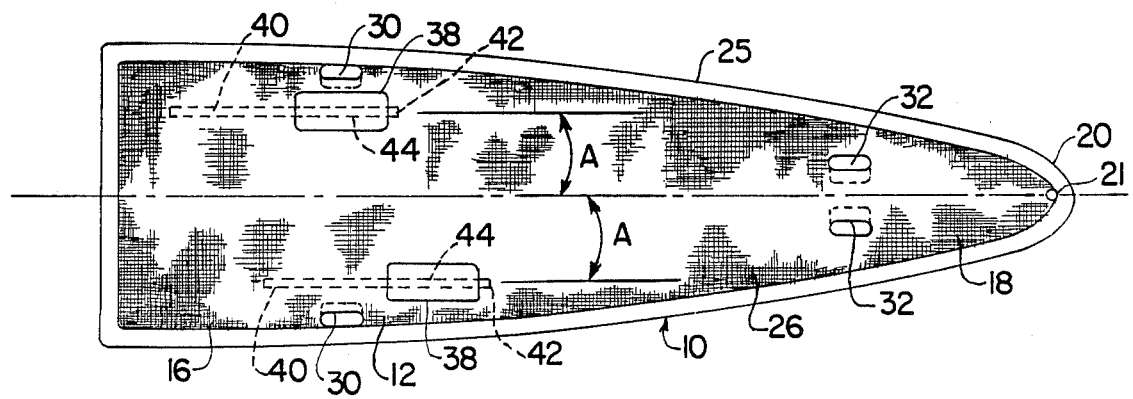
FIG. 1 is a top plan view of a recreational board of the present invention.
Figure 3:
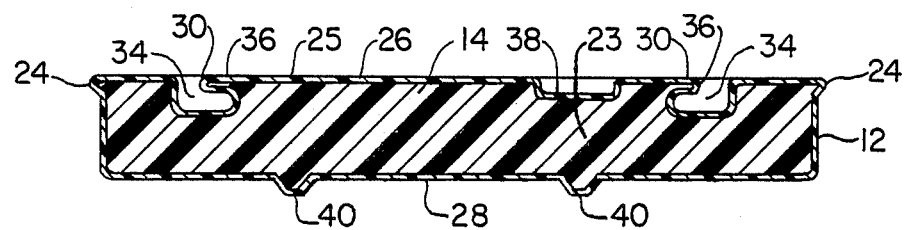
FIG. 3 is an enlarged section taken on line 3—3 of FIG. 2.

There is generally indicated at 10 in FIG. 1 a recreational apparatus constructed according to one presently preferred embodiment of the present invention and including an elongated body member 12 formed as a thin walled hollow shell 25 having an upper surface 26, a lower surface 28 and and intervening peripheral side wall 22 defining a hollow interior space 23 (FIG. 3). Body 12 preferably is formed of molded plastic such as molded polyethelene with a nominal wall thickness of approximately ⅛ inch, for example. The hollow interior space 23 of body 12 preferably is filled with plastic foam 14 (FIG. 3) to provide additional structural rigidity, and to support the molded plastic body 12 against inward collapse of the respective exterior surfaces and side walls. The foam filling additionally provides for floatation during water use of the apparatus 10.

Figure 2:
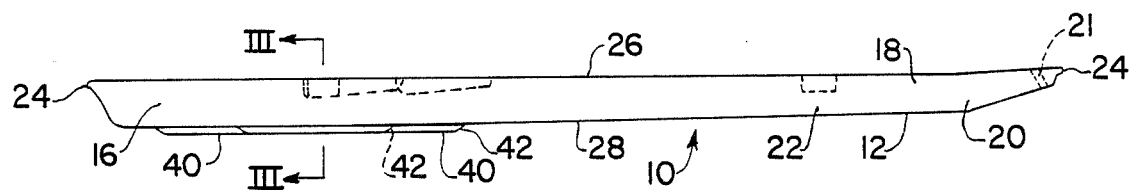
FIG. 2 is a side elevation of the board of FIG. 1.

From FIGS. 1 and 2 it will be seen that body 12 includes a relatively broad rearward portion 16 and tapers to a relatively narrower front portion 18 which terminates in a rounded bow or nose 20. Nose 20 has a centrally located through opening 21 for attachment of a tow rope and/or a rope for the user to maintain his stability while riding the apparatus 10.

The body 12 preferably is proportioned such that the width of the rearward portion 16 is approximately one third of the overall length of body 12 and is approximately seven times the nominal thickness of body 12. Accordingly, the proportions of body 12 are that of an elongated, tapering and relatively thin section structure. It will be appreciated that the recited proportions as well as any other dimensions and other physical parameters recited herein are exemplary in nature except as otherwise noted.

It will be seen in FIGS. 2 and 3 that the continuous peripheral side wall 22 preferably flares upwardly and outwardly from surface 28 to surface 26 to terminate adjacent its upper extent in a formed lip 24 which, in cooperation with the outward flare of side wall 22, serves to direct snow or water away from apparatus 10 and its user.

Also evident in FIG. 2 is the formed profile of body 12 in which a maximum thickness is provided adjacent rear portion 16. Body 12 tapers gradually to a lesser thickness toward forward portion 18. Nose 20 tapers upwardly to thus prevent board 10 from diving when in water use or from digging into the snow when in snow use.

Upper surfaces 26 of body 12 is formed as by embossing or other suitable technique with a non-slip texture to enhance user safety and comfort. As an alternative, the surface 26 may be provided with an applique of abrasive or other non-slip material applied with suitable adhesive to provide such non-slip surface.

Upper surface 26 is provided with structural features as follows. A pair of integrally molded handgrips 30 are molded into surface 26 at laterally spaced apart locations on body portion 16 and an additional pair of laterally spaced, molded handgrips 32 is provided in surface 26 adjacent the center line of body 12 in the forward portion 18 thereof. Each handgrip 30, 32 includes a molded depression 34 which extends downwardly and under an integrally molded grab handle portion 36 whereby a user is able to grip the grab handle portion 36 even though it does not protrude to any significant extent above the plane of surface 26. Handgrips 32 are structurally similar to handgrips 30 in all salient respects.

Also provided in the rearward end portion 16 of body 12 is a pair of integrally molded foot receiving depressions 38 which are spaced apart in both the lateral and longitudinal directions whereby a user utilizing the depressions 38 is afforded a stable stance with respect to both lateral and fore and aft balance considerations. Depressions 38 preferably are of minimal depth, ⅛ inch for example, adjacent their forward ends, and deepen slightly toward their respective rearward ends. It is further contemplated that depressions 38 may be formed to conform generally to the profile of the bottom of the respective left and right adult human feet for enhanced comfort, stability and utility. The placement of the users feet within depressions 38 provides reaction surfaces, particularly lateral reaction surfaces, against which the rider may work with his feet, through body weight positioning and distribution, to steer apparatus 10 as will be described hereinbelow.

Lower surface 28 is provided adjacent the rearward body end portion 16 with a pair of integrally formed elongated guide runners 40 which are located on surface 28 to be both laterally spaced apart and longitudinally offset from one another to approximately the same extent as the lateral spacing and longitudinal offset between depressions 38. Preferably, guide runners 40 are of approximately 20 inches length and may project below surface 28, tapering in transverse dimension from approximately ⅛ inch adjacent the forward end 42 thereof to approximately ¾ inch thickness adjacent the rearward ends thereof. These specific dimensions are suitable for an apparatus 10 approximately conforming to the above cited proportions and dimensions, although again it is noted that recited dimensions, within certain limits, are exemplary and are not to be considered limiting on the invention.

Guide runners 40 preferably are located such that a forward extent 44 of each runner 40 adjacent forward end 42 thereof generally underlies a respective one of the foot receiving depressions 38.

Guide runners 40 are not parallel. Rather, they diverge outwardly toward nose 20 from the center line of board 10 at a small angle A in the range of approximately 1 degree to approximately 10 degrees. Preferably, an angle of 2 to 5 degrees is to be used. Due to the small magnitude of the angle A, and the fact that the figures are not necessarily to scale nor executed with the accuracy of working drawings, the divergence of guide runners 40 may be imperceptible in FIG. 1. It is believed a larger angle of divergence than specified will increase a "snow plow" effect which may inhibit performance of the apparatus 10 on both snow and water. A lesser angle of divergence may reduce the steering capability of guide runner 40.

In use, on either snow or water, the user may ride apparatus 10 in a prone position, facing the forward end thereof and utilizing handgrips 32 to maintain a secure position thereon. The described non-slip surface also is beneficial in this regard. Alternatively, the user may utilize the apparatus 10 in a standing position by placing his or her feet in foot depressions 38 and steadying himself or herself by holding onto a rope (not shown) anchored in opening 21. Handgrips 30 are provided for the user who wishes to ride apparatus 10 in a sitting position.

The steering capability afforded by guide runners 40 is dependent in part on their angle of divergence as noted above, and in part on their longitudinal offset with respect to one another. Accordingly, although steering capability is available to some extent for a user who chooses an alternate position such as a seated position, through shifting of body weight, the full scope of steering capability is most suitably realized by the user who assumes a standing position and utilizes foot depressions 38 as above described. Thus, by distribution of weight and adjustment of body position between the feet, the standing user is able to steer apparatus 10 by virtue of the steering action of diverging guide runners 40 in either snow or water.

The longitudinal offset of guide runners 40 corresponds to the offset of foot depressions 39 to provide a uniform steering effect in steering to either the left or right. That is, the weight shift from foot to foot will have approximately the same influence on steering to either left or right because the resulting application of greater or lesser body weight with respect to the respective guide runners produces a uniform effect due to the corresponding offset between foot depressions 38 and guide runners 40. The described divergence of runners 40 provides for an effective steering mechanism. The described longitudinal offset permits effective and uniform steering response by user weight shifting in an apparatus which permits the user to position his feet in longitudinally offset and laterally spaced relationship to enhance user stability in both the longitudinal and lateral directions.

According to the description hereinabove there is provided by the instant invention a novel recreational apparatus adapted for use on both snow and water, and including novel means which permits a variety of user positions and a steering capability which is effective through the advantageous positioning of the user thereon and without reliance on any moveable rudder or other such conventional steering means.

Inasmuch as the above description relates to a presently preferred embodiment of the invention, it is to be appreciated that the invention may be practiced in numerous alternative embodiments with various modifications thereto without departing from the broad spirit and scope thereof. For example, apparatus 10 need not necessarily be constructed of molded plastic nor need it necessarily be foam filled. Additionally, the specific physical parameters and proportions described hereinabove are variable within a considerable design latitude and additional or complementary features over and above those described may be incorporated. For example, pliable straps of leather or other suitable material may be employed to bridge foot depressions 38 and handgrips 30 and 32 to enhance the utility thereof by further securing the grip of the user's hands or feet therein. Additionally, the specific longitudinal extent and form of guide runners 40 may be varied within a latitude of acceptable design parameters.

Additionally, the specific configuration of the guide runners may be varied, as for example by curving the forward ends thereof outwardly whereby the forward ends will diverge more than the remaining length of the respective guide runners.

These and other embodiments and modifications having been envisioned and anticipated by the inventor, it is intended that the invention be construed as broadly as permitted by the scope of the claims appended hereto.

I claim:

1. In a recreational apparatus including an elongated body member adapted to carry a rider on snow or water and including steering means comprised of a pair of foot receiving depressions adapted to receive the feet of a rider in the standing position and a pair of elongated substantially identical guide runners adapted to control the path of motion of the apparatus through snow or water, the improved structure comprising:
    said foot receiving depressions being spaced laterally apart and being longitudinally offset from one another and being oriented to accommodate a rider's feet only when the feet are oriented longitudinally of the apparatus, and the respective said guide runners being spaced laterally apart and being longitudinally offset from one another and positioned such that each of said foot receiving depressions overlies the respective one of said guide runners in a manner to provide a uniform positional relationship between the feet of such a rider received in said foot receiving depressions and the respective guide runners.

2. The improvement as claimed in claim 1 wherein said guide runners diverge toward the forward end of the elongated body member.

3. A recreational apparatus for use by a rider to ride on snow or water comprising:
    an elongated body member;
    said body member including an upper surface which is adapted to carry a rider and lower surface which is adapted to engage a snow or water surface for support of said apparatus thereon;
    said upper surface including a pair of laterally spaced apart and longitudinally offset foot receiving depressions formed in said upper surface for receiving the feet of such a rider for riding said recreational apparatus in a standing position; said depressions being formed to accommodate the rider's feet only when the feet are oriented longitudinally of said apparatus; and said lower surface including a longitudinally extending surface portion underlying said foot receiving depressions with said longitudinally extending surface portion having thereon steering means comprised of a pair of elongated longitudinally extending guide runners which are spaced laterally apart and are longitudinally offset from one another with respect to the longitudinal extent of said body member in a manner that each of said guide runners generally underlies one of said foot receiving means.

4. The recreational apparatus claimed in claim 3 wherein said body member tapers from a relatively wider rearward end portion thereof to a relatively narrower forward end portion thereof.

5. The recreational apparatus as claimed in claim 4 wherein said forward end portion includes an upwardly tapering nose portion.

6. The recreational apparatus as claimed in claim 3 wherein said elongated guide runners are formed integrally with said lower surface portion.

7. The recreational apparatus as claimed in claim 6 wherein said guide runners are longitudinally offset from one another to approximately the same longitudinal extent as are said foot receiving depressions.

8. The recreational apparatus as claimed in claim 7 wherein each of said foot receiving depressions generally overlies a forward end portion of the respective one of said guide runners.

9. The recreational apparatus as claimed in claim 8 wherein said guide runners are of substantially equal length.

10. The recreational apparatus as claimed in claim 3 wherein said guide runners diverge outwardly toward the forward end of said body member by an angle in the range of approximately 1 degree to 10 degrees with respect to the longitudinal center line of said body member.

11. The recreational apparatus as claimed in claim 10 wherein said guide runners diverge outwardly toward the forward end of said body member by an angle in the range of 2 to 5 degrees with respect to the longitudinal center line of said body member.

12. The recreational apparatus as claimed in claim 11 wherein said upper surface additionally includes handgrip means for use by such a rider.

13. The recreational apparatus as claimed in claim 12 wherein said handgrip means includes at least one pair of handgrips adapted for use by a prone rider, and at least one pair of handgrips adapted for use by a seated rider.

14. The recreational apparatus as claimed in claim 13 wherein said body member includes a unitary molded body wherein said foot receiving depressions, said handgrip means and said guide runners are formed integrally with said molded body.

15. The recreational apparatus as claimed in claim 14 wherein said body member comprises a shell member which encloses an internal cavity that is filled with self-supporting foamed material.

16. The recreational apparatus as claimed in claim 3 wherein said foot receiving depressions are of a minimum depth adjacent a forward end thereof and are of continuously increasing depth at points therein progressively further rearward from said forward end thereof.

* * * * *